US011577821B1

(12) United States Patent
Collmus et al.

(10) Patent No.: US 11,577,821 B1
(45) Date of Patent: Feb. 14, 2023

(54) YOKE INTERFACE MOUNT

(71) Applicant: The United States of America, as represented by the Secretary of the Navy, Arlington, VA (US)

(72) Inventors: John P. Collmus, Camarillo, CA (US); Nicholas J. Duckworth, Annapolis, MD (US); Scott M. Reider, Camarillo, CA (US); Chong T. Oh, Camarillo, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 51 days.

(21) Appl. No.: 17/394,673

(22) Filed: Aug. 5, 2021

Related U.S. Application Data

(63) Continuation of application No. 16/265,217, filed on Feb. 1, 2019, now Pat. No. 11,124,288.

(51) Int. Cl.
*B64C 13/04* (2006.01)

(52) U.S. Cl.
CPC ................ *B64C 13/0423* (2018.01)

(58) Field of Classification Search
CPC ....... B64C 13/02; B64C 13/04; B64C 13/042; B64C 13/0423; B64D 2045/0075
USPC .......................................................... 244/234
See application file for complete search history.

(56) References Cited

U.S. PATENT DOCUMENTS

| | | | | |
|---|---|---|---|---|
| 3,726,497 A | * | 4/1973 | Gannett | B64C 13/12 244/234 |
| 5,016,147 A | * | 5/1991 | Voorhees | B64D 43/00 362/249.05 |
| 5,222,690 A | * | 6/1993 | Jeffords | B64D 43/00 224/276 |
| 5,626,320 A | * | 5/1997 | Burrell | B64D 43/00 248/231.71 |
| 9,382,015 B2 | * | 7/2016 | Farnes | B64D 45/00 |
| 2009/0108152 A1 | * | 4/2009 | Carnevali | F16B 47/00 248/205.5 |
| 2009/0294607 A1 | * | 12/2009 | Klingel | G01S 19/35 248/205.1 |
| 2011/0101058 A1 | * | 5/2011 | Heckman | B64D 45/00 224/401 |
| 2012/0248166 A1 | * | 10/2012 | Gold | F16M 13/022 248/636 |
| 2012/0261520 A1 | * | 10/2012 | Groomes | F16M 11/10 244/234 |
| 2013/0020363 A1 | * | 1/2013 | Fraser | B60R 11/02 224/483 |

(Continued)

OTHER PUBLICATIONS

"IPad Yoke Faceplate Mount for Beech." Jan. 26, 2016. Retrieved from https://web.archive.org/web/20160126151423/https://www.angerole.com/IpadYokeFaceplate.htm on May 19, 2021. (Year: 2016).*

*Primary Examiner* — Brady W Frazier
(74) *Attorney, Agent, or Firm* — Naval Air Warfare Center Weapons Division; James M. Saunders

(57) ABSTRACT

The embodiments are directed to an interface mount between a vehicle steering/control device and a mobile computer protective case. The interface mount has two sides. One side of the interface mount is attached to the vehicle steering/control device. The other side of the interface mount is attached to an AMPS hole pattern plate.

3 Claims, 13 Drawing Sheets

(56) References Cited

U.S. PATENT DOCUMENTS

2015/0259068 A1\* 9/2015 Sanders ................ B64D 43/00
29/434

\* cited by examiner

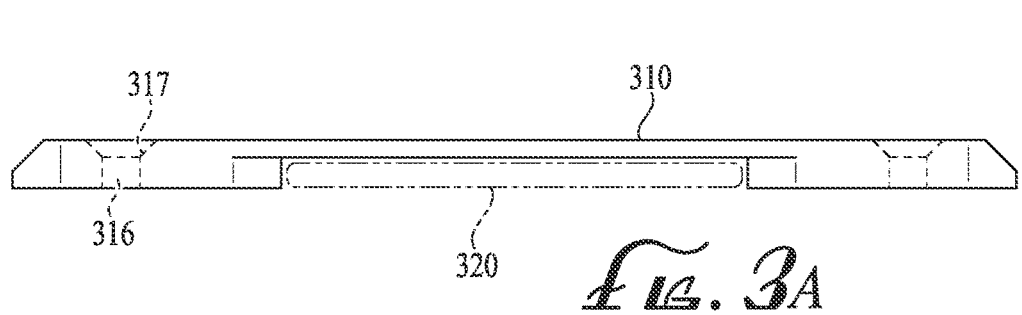
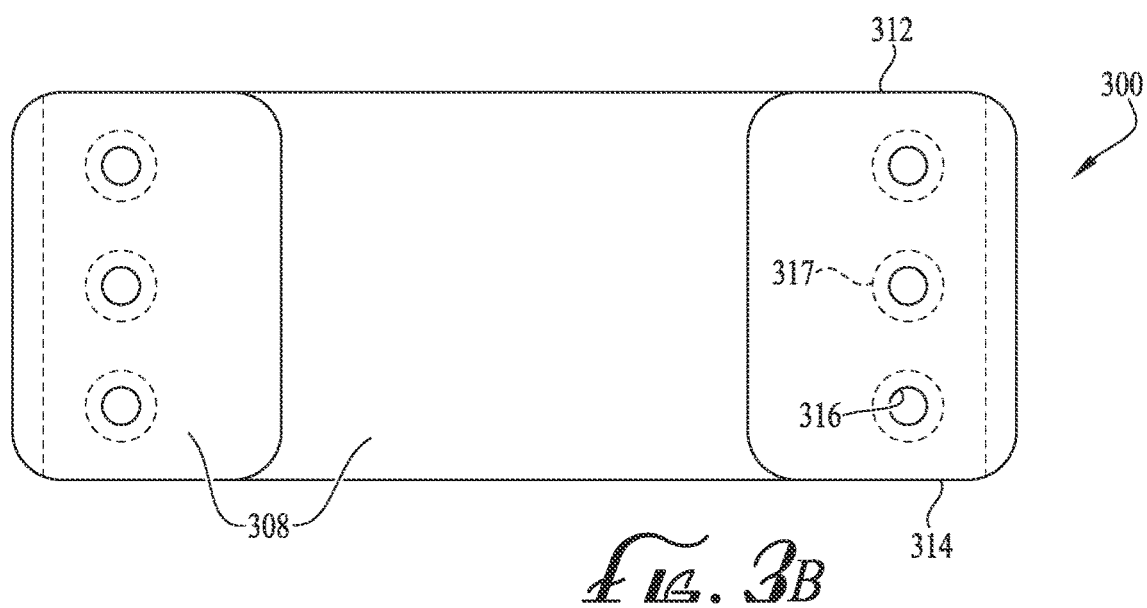
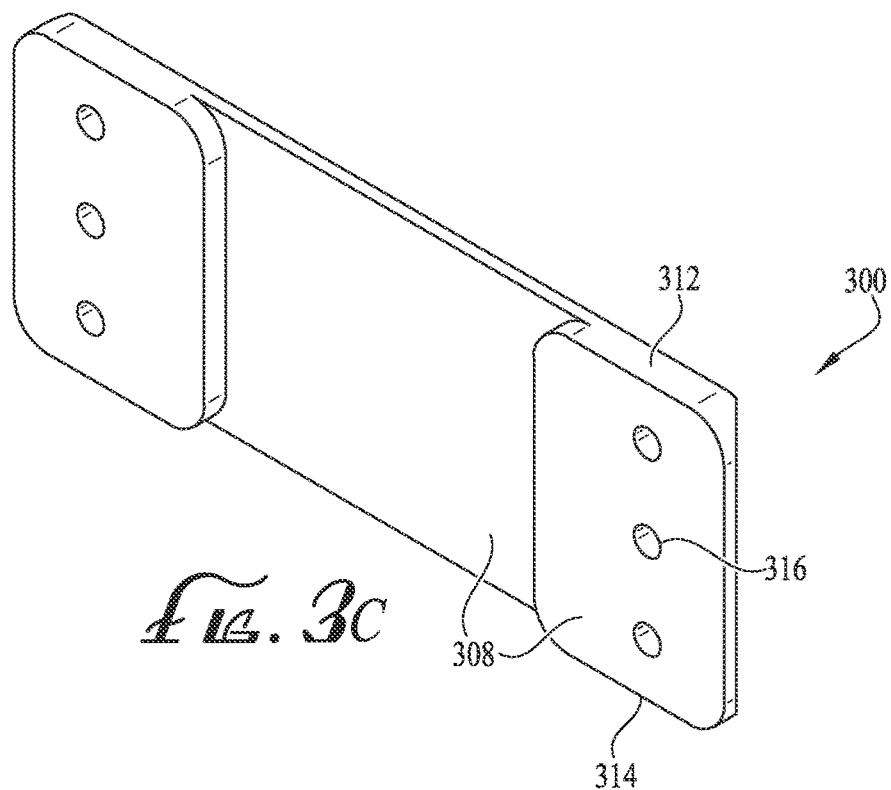

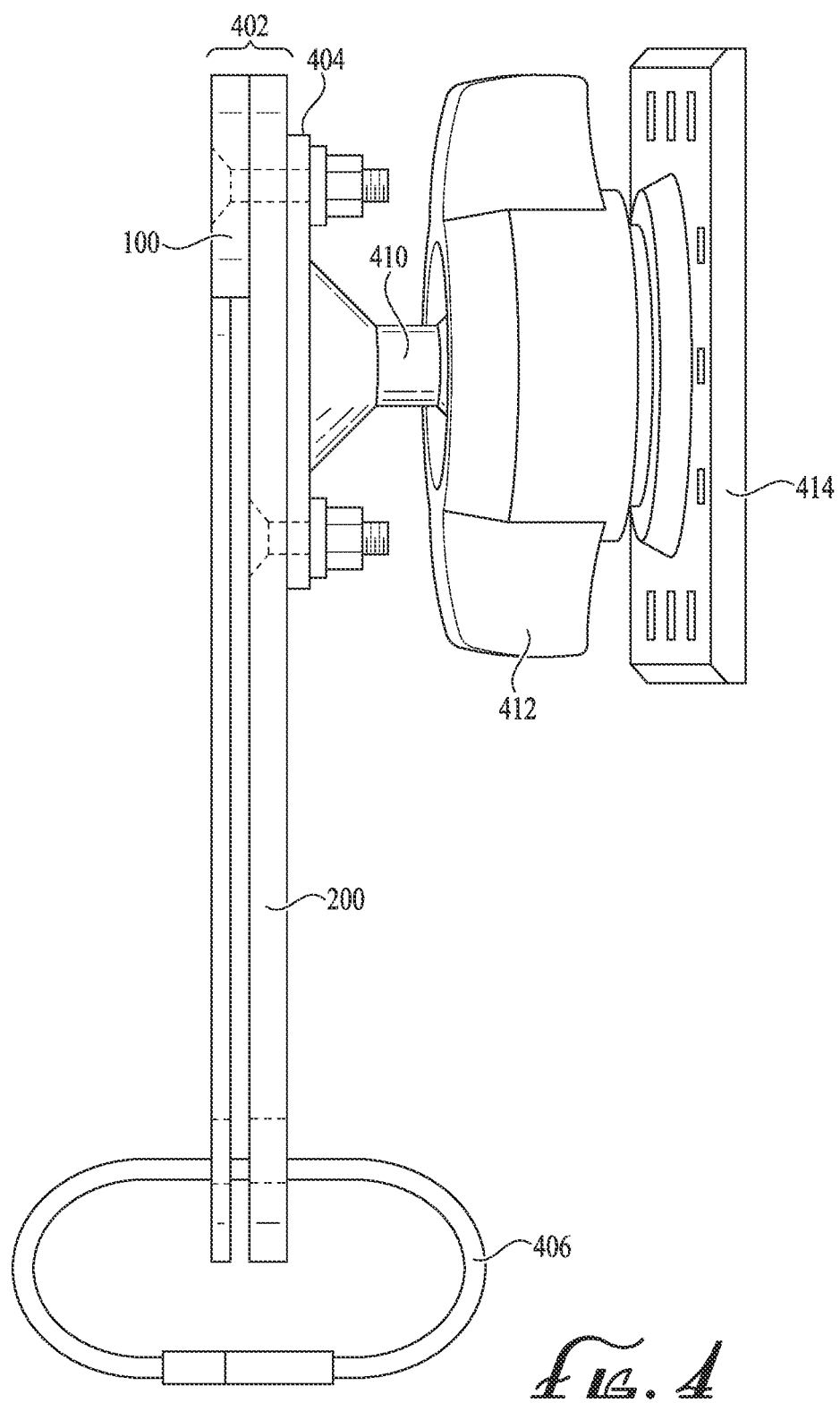

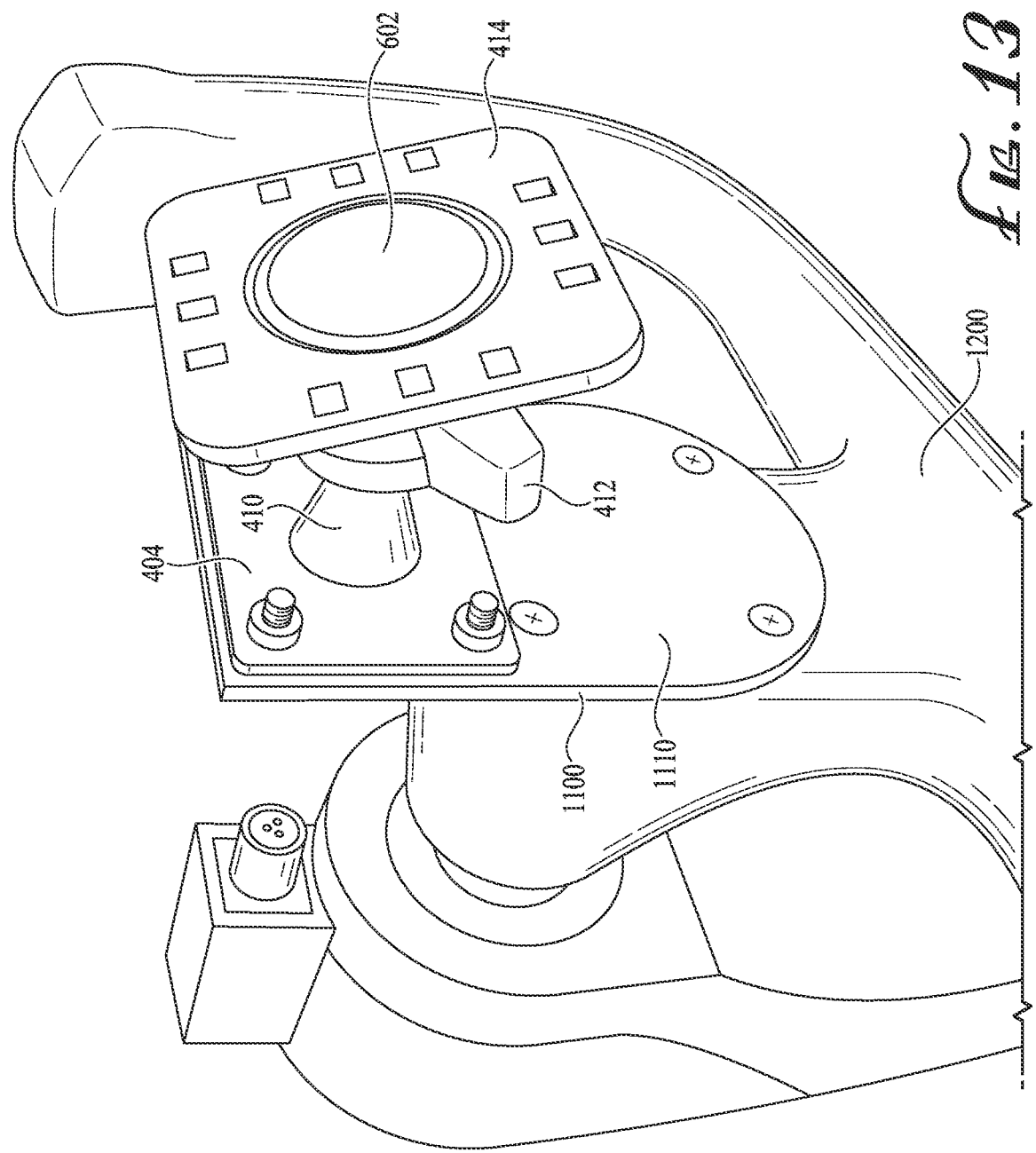

YOKE INTERFACE MOUNT

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD

The embodiments generally relate to yoke interface mounts.

BRIEF DESCRIPTION OF THE DRAWINGS

FIG. A is a plan view of a T-shaped member, according to some embodiments.

FIG. 3A is a top profile view of a sleeve from a yoke faceplate that the T-shaped member in FIG. 1A is configured to engage.

FIG. 3B is a plan view of the back side of the sleeve in FIG. 3A.

FIG. 3C is an isometric view of the sleeve in FIG. 3A.

FIG. 4 is a side profile of an assembled apparatus, according to some embodiments, with the assembled apparatus attached to an AMPS hole pattern plate and an example attachment system that is configured to attach to a mobile computer protective case (not shown).

FIG. 13 is a side perspective view of the interface plate from FIGS. 11A and 11B attached to the yoke in FIG. 12 and an AMPS hole pattern plate assembly.

It is to be understood that the foregoing general description and the following detailed description are exemplary and explanatory only and are not to be viewed as being restrictive of the embodiments, as claimed. Further advantages of the embodiments will be apparent after a review of the following detailed description of the disclosed embodiments, which are illustrated schematically in the accompanying drawings and in the appended claims.

DETAILED DESCRIPTION OF EMBODIMENTS

Embodiments may be understood more readily by reference in the following detailed description taking in connection with the accompanying figures and examples. It is understood that embodiments are not limited to the specific devices, methods, conditions or parameters described and/or shown herein, and that the terminology used herein is for the purpose of describing particular embodiments by way of example only and is not intended to be limiting of the claimed embodiments. Unless stated otherwise, the singular forms "a," "an," and "the" include the plural.

The embodiments are a stable, secure interface adaptor, sometimes referred to as an interface mount, between a vehicle steering/control device and a mobile computer protective case, sometimes referred to as a tablet computer protective case. The vehicle steering/control device can also be referred to as a steering wheel and yoke. The interface mount is semi-permanently attached to the yoke.

Current approach plate holders, used by aircraft pilots, hold paper maps and have been problematic because the paper maps and plate holders have fallen near the rudder pedals during both normal and evasive maneuvering. The same problems could be experienced in other vehicles. The semi-permanent attachment of the embodiments increases safety by remaining attached to the yoke.

Additionally, the embodiments replace paper maps with digital maps, allowing for significant cost savings and faster map updates. Likewise, the embodiments maintain pilot visibility outside aircraft windows by remaining attached to the yoke and not near or on, for example, cockpit windows or window sills. Finally, the embodiments are performing admirably during experimental testing. The embodiments lend themselves for use on ship, aircraft, submarines, automobiles, and other vehicles.

Although embodiments are described in considerable detail, including references to certain versions thereof, other versions are possible. Examples of other versions include alternative configurations without sacrificing safety requirements in a limited space environment. Therefore, the spirit and scope of the appended claims should not be limited to the description of versions included herein.

Conventions, Parameters, and Terminology

At the outset, it is helpful to describe various conventions, parameters, and terminology associated with embodiments of the invention.

AMPS Pattern/AMPS Hole Pattern

Figure 1A:
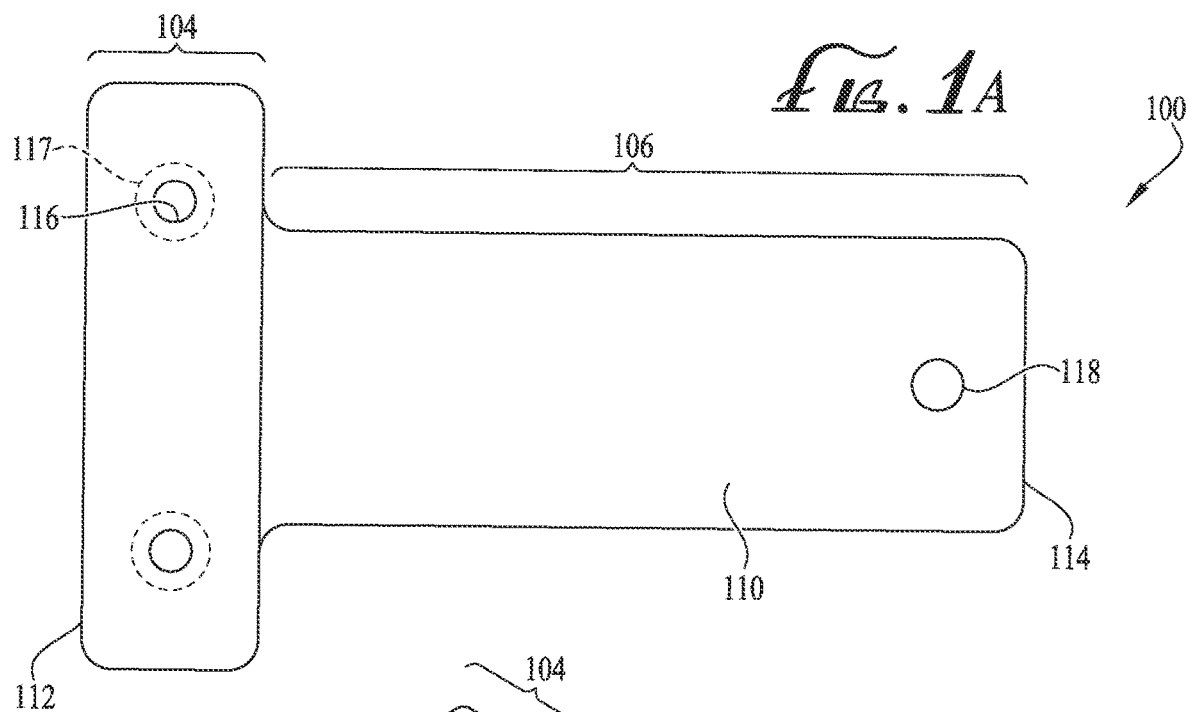
FIG. 1B is an isometric view of the T-shaped member in FIG. 1A.
FIG. 1C is a profile view of the T-shaped member in FIG. 1A.
Figure 1B:
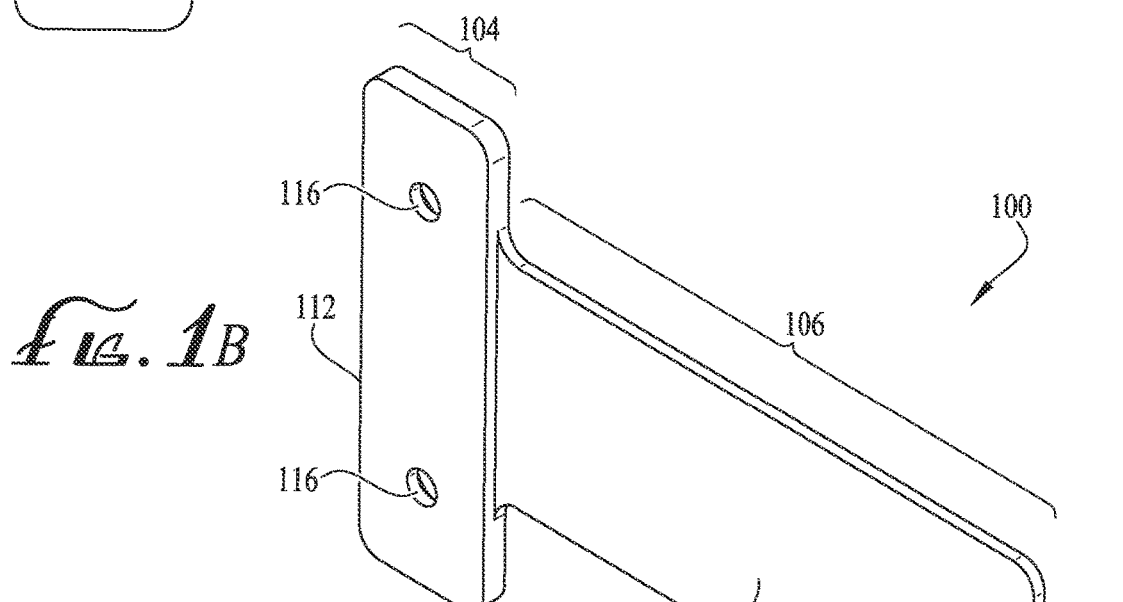
Figure 1C:
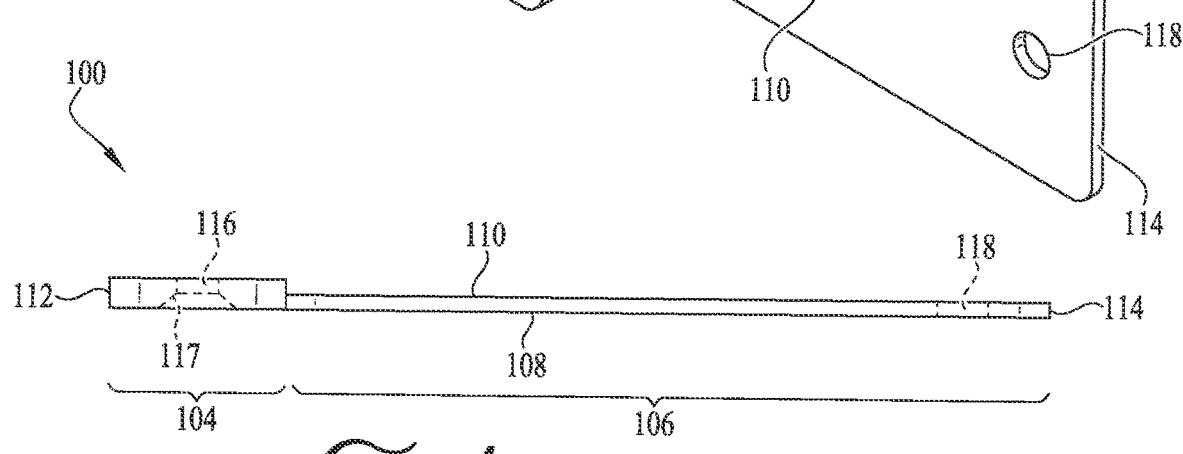

The terms "AMPS pattern" and "AMPS hole pattern" are industry standard hole configurations that are synonymous with various mounting devices. The AMPS pattern is a series of four holes aligned in a rectangular pattern. Some mounts will use two of the four holes while maintaining the standard pattern spacing dimensions. Typically, the four holes are located in a rectangular pattern at 1.181 inches×1.496 inches (30 mm×38 mm). FIGS. 2A, 2B, 8A, 8B, 11A, and 11B depict four hole AMPS hole patterns (reference characters 216, 816, and 1116, respectively). FIGS. 1A & 1B depict two holes of an AMPS hole patterns in reference character 116.

Directions—Front and Back

The terms "front" and "back" are used throughout. The embodiments rely on "front" being the surface(s) closest to the embodiments' operator(s), such as drivers and pilots. Similarly, the term "back" refers to the surface(s) furthest from the user. For nomenclature, generally, "back" is synonymous with a "first" side and "front" is synonymous with a "second" side, because attachment of the embodiments begins with the "back" side of various members attaching to the vehicle control device.

Directions—Vertical

Figure 5:
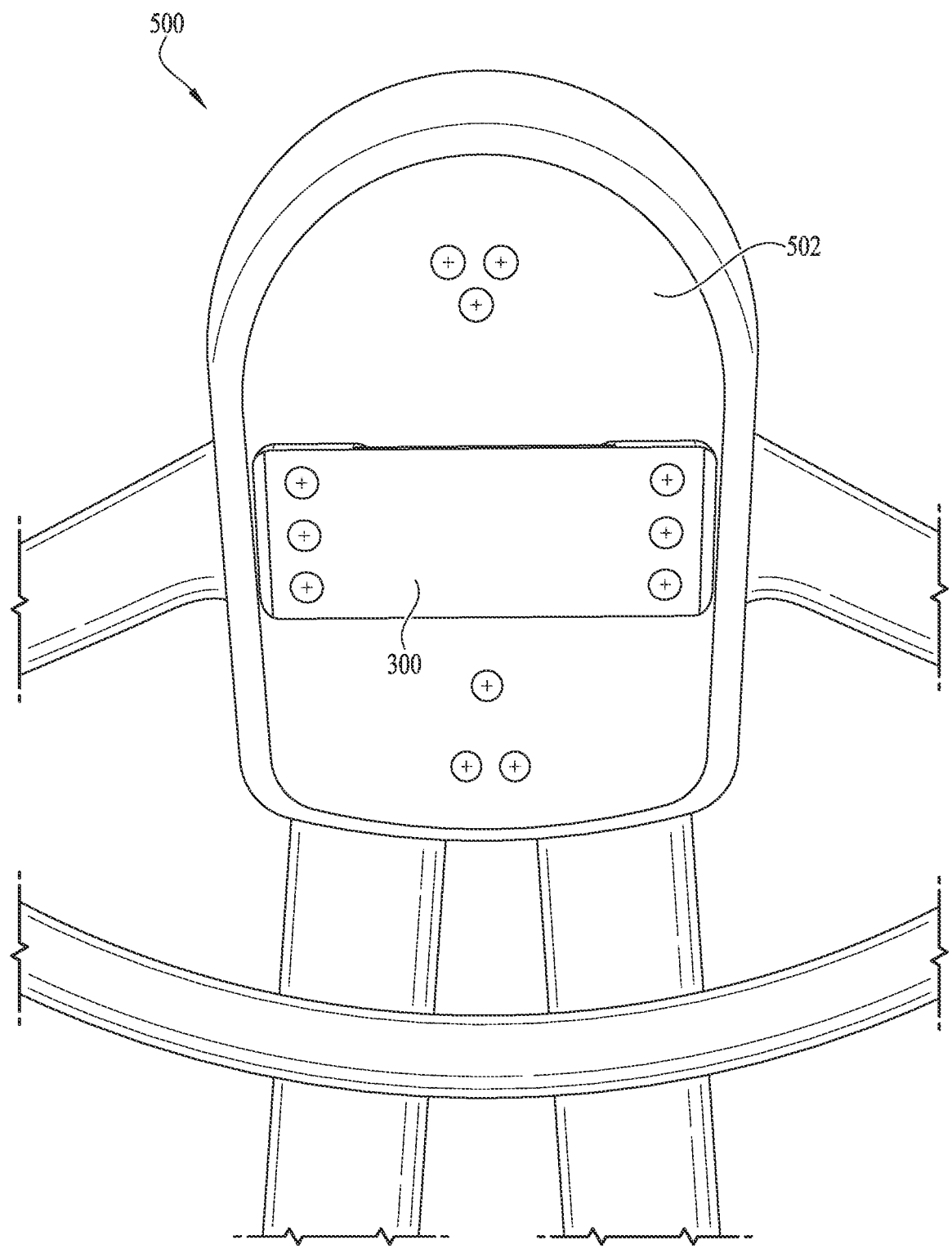
FIG. 5 is a close-up front perspective view of a vehicle control device including a faceplate, according to some embodiments.

The term "vertical" is used with respect to an opening (reference character 300). The opening 300 is sometimes referred to as a sleeve, vertical opening, vertical sleeve opening, and the like. The sleeve 300 is on the front of a yoke 500 in some aircraft. The sleeve 300 is shown in FIGS. 3A, 3B, and 3C, and is also referred to as a vertical sleeve opening, vertical opening, and the like. Specifically, "vertical" is in relation to the orientation of an aircraft yoke and the insertion of a distal end 114 of a T-shaped member 100 into the sleeve 300. As shown in FIG. 5, the yoke 500, faceplate 502, and sleeve 300 are depicted from the pilot's perspective. The sleeve 300 has a void 320 (FIG. 3A) when installed on the faceplate 502. The distal end 114 of the T-shaped member 100 is inserted into the void 320. The void 320 can also be referred to as a "channel" when installed on the faceplate 502. The channel 320 is vertical from the pilot's perspective, i.e. from the proximal end 312 to the distal end 314 of the sleeve 300. Similar designations of vertical apply in the other embodiments, i.e. from the vehicle operator's/pilot's perspective.

Components and Materials Used in the Embodiments

The components and materials used in the embodiments are selected based on their suitability for vehicle cabins, especially aircraft cockpits, as discussed below. Thus, for all embodiments, the components are arranged to achieve a work-piece environment where the embodiments are configured to act on vehicle control devices, such as aircraft yokes.

Plates and Members—Anodized Aluminum & Painted Black

The embodiments use varying-shaped plates, sometimes referred to as "member," to attach to vehicle control devices 500 as depicted in several of the figures. The various shaped plates are identified by reference characters 100, 200, 800, and 1100, and are anodized aluminum and painted black to be anti-reflective.

Holes in the Plates

Embodiments rely on matching existing attachment points in legacy aircraft. Most attachment points are screws or bolts and nuts through various holes attaching components together. Appropriate threading, although not specifically shown in the figures, is included as needed for secure attachment. Some figures depict assembled components attached with various screws, bolts, and nuts. Reference characters for the screws, bolts, and nuts are not provided for ease of viewing. Components can also be attached by various adhesives. However, adhesives are more permanent and makes removing components difficult. The various holes are shown with reference characters 116, 118, 216, 218, 316, 816, 818, 1116, and 1118. Some holes are pass-through holes, while other holes are countersunk so that a screw or bolt head will lie flush with or below the surface. Additionally, the countersunk features are selected and arranged as shown in the accompanying figures to maintain a low profile for the embodiments, which is especially important in limited space environments, including aircraft cockpits. For reference, countersunk features are depicted with references 117, 217, 317, 817, 819, 1117, and 1119.

Rounded Plate Edges

For all embodiments, the radii are generally selected to avoid sharp edges and improve the tactile feel of the members. The various members, plates, and attachment features are so dimensioned as to maintain a low profile to reduce fabric snagging and not degrade the pilot's ability to control the aircraft. Thus, for example, the edges in plates 100, 200, 800, and 1100 are rounded to prevent lacerations and fabric snagging.

Apparatus, System, and Method Embodiments

In the drawings, like reference numbers indicate like elements. The associated figures are valid for apparatus, system, and method embodiments. Reference characters 402, 800, and 1100 in FIGS. 4, 8A, 8B, 11A, and 11B depict apparatuses. Components may exist singularly or in pluralities, even though depicted as one or the other in the figures for simplified viewing without detracting from the merits or generality of embodiments.

Figure 6:
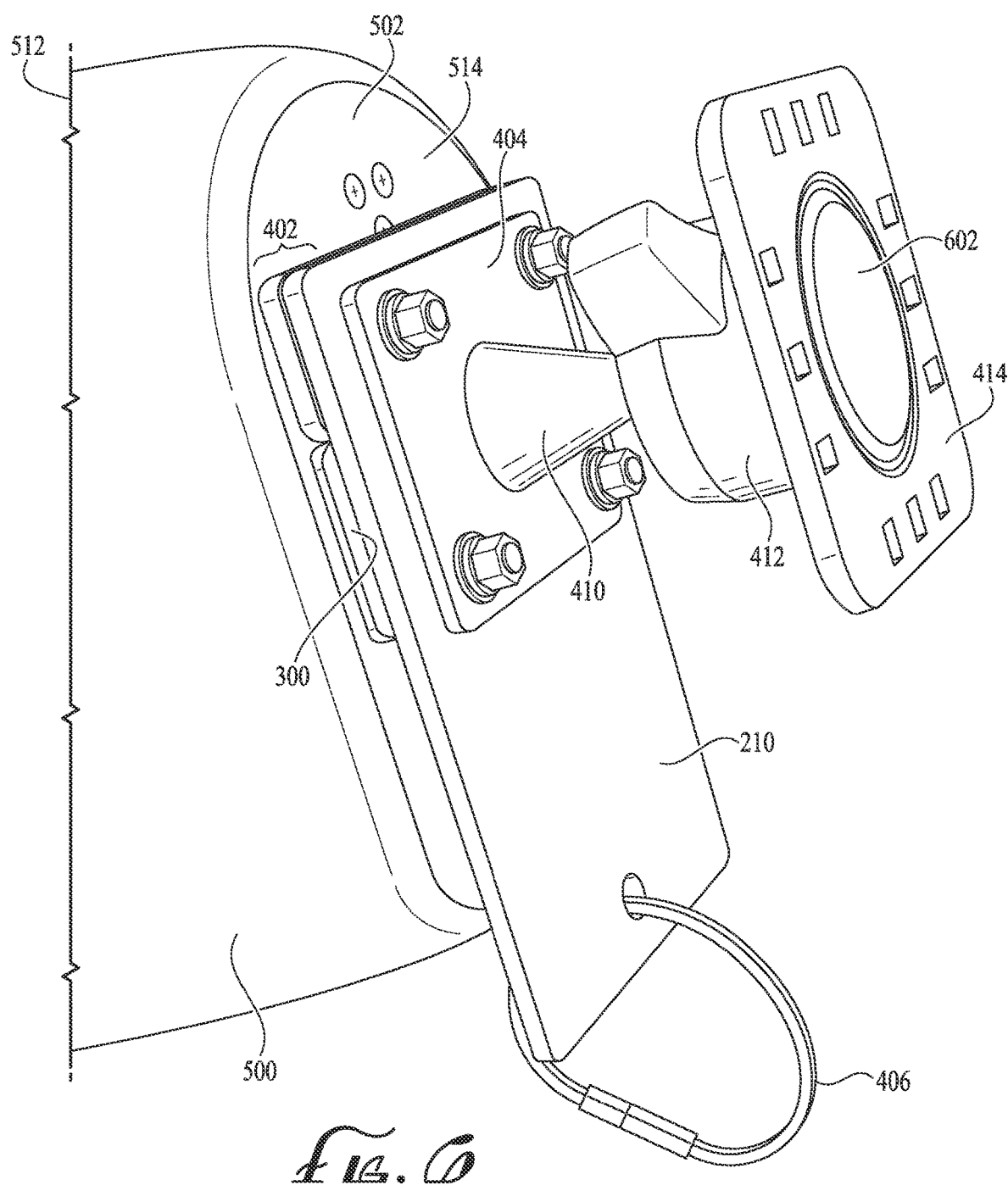
FIG. 6 is a side isometric view of the assembled apparatus in FIG. 4 attached to the vehicle control device in FIG. 5.
Figure 7:
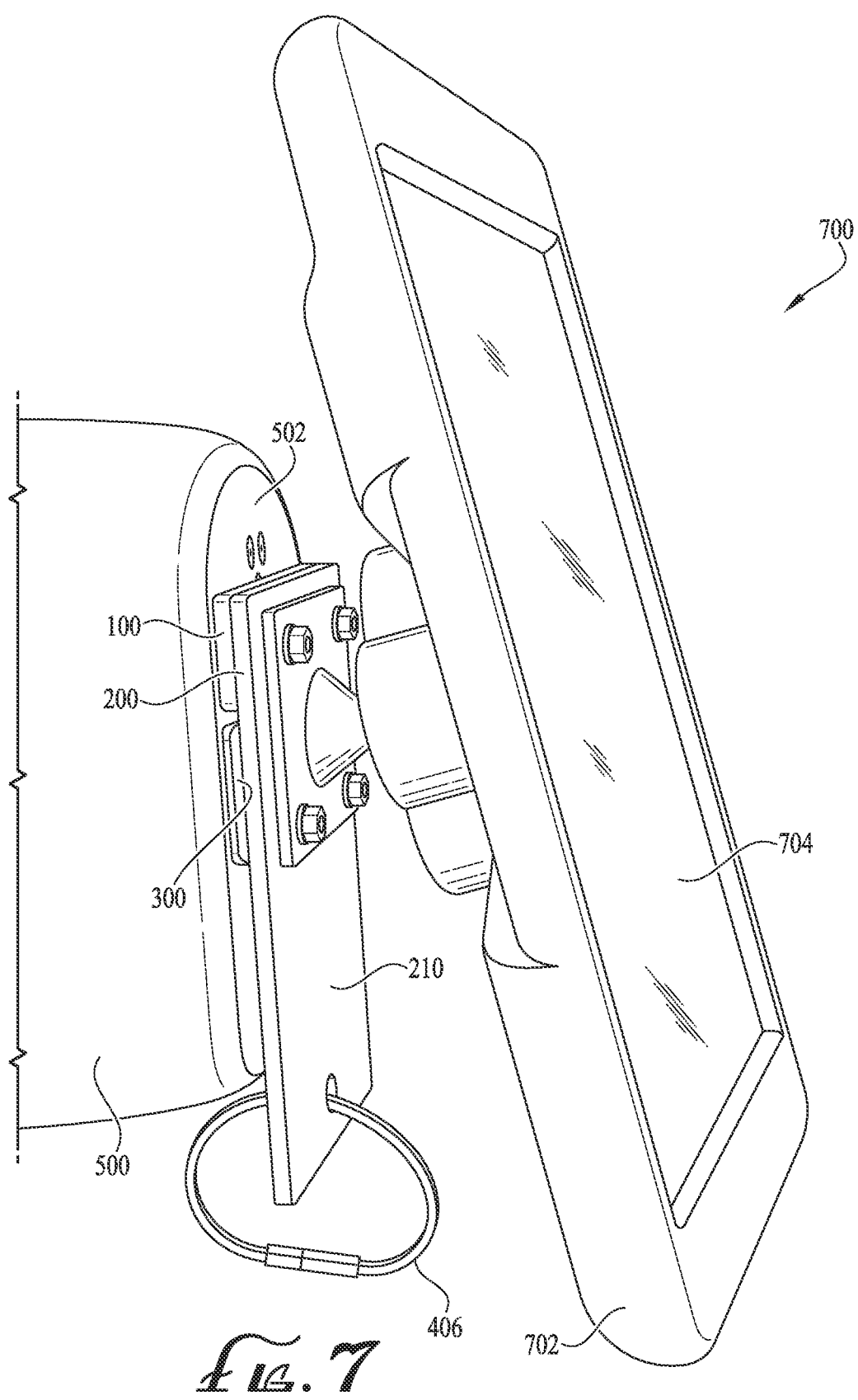
FIG. 7 is a close-up side perspective view of the assembled apparatus from FIGS. 4 & 6 attached to the AMPS hole pattern plate with dog bone member, locking nut, and a mounting plate attached to a mobile computer protective case containing a mobile computer.

Referring to FIGS. 1A, 1B, 1C, 2A, 2B, 2C and 4, the embodiments generally relate to an adaptor mount 402 (FIG. 4), sometimes referred to as an adaptor, interface mount, yoke interface, and similar terms. As such, the terms are used interchangeably. The interface mount 402 is an interface, i.e. a surface or junction, between a vehicle control device 500 in (FIGS. 5,6, & 7) and an AMPS hole pattern plate 404 (FIGS. 4,6, & 7). The interface mount 402 includes a T-shaped member or plate 100 (FIGS. 1, 1B, and 1C) having a first portion 104, a second portion 106, a back side (first side) 108, a front side (second side) 110, a proximal end 112, and a distal end 114.

Figure 2A:
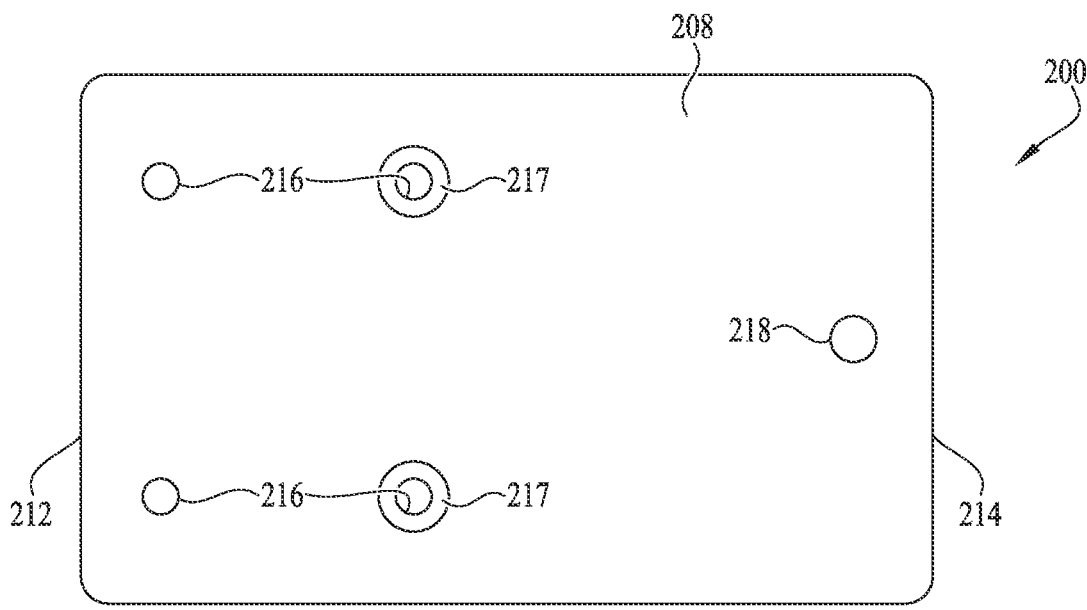
FIG. 2A is a plan view of a rectangular-shaped member, according to some embodiments.
Figure 2B:
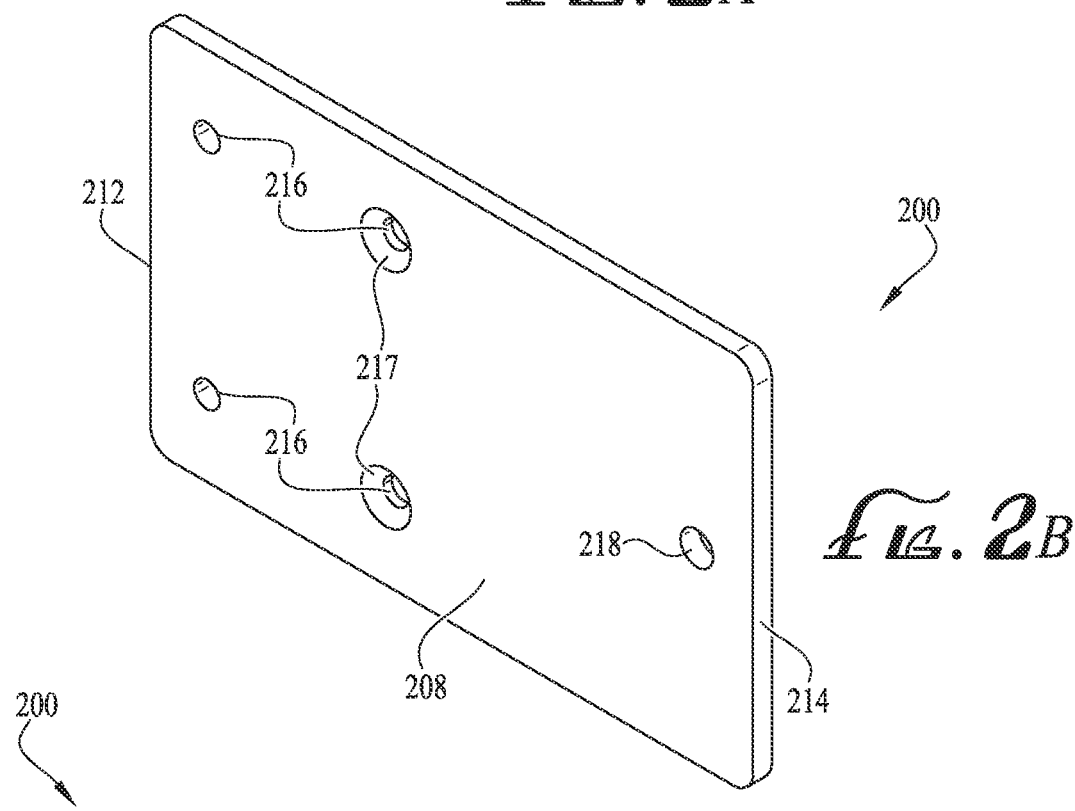
FIG. 2B is an isometric view of the rectangular-shaped member in FIG. 1A.
Figure 2C:
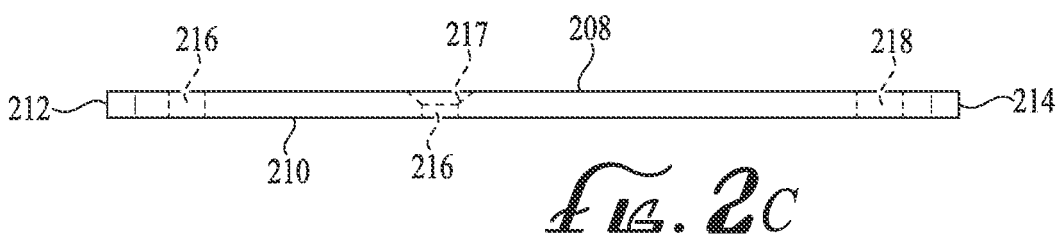
FIG. 2C is a side profile view of the rectangular-shaped member in FIG. 1A.

FIGS. 2A, 2B, and 2C depict a rectangular-shaped member or plate 200 having a back side (first side) 208, a front side (second side) 210, a proximal end 212, a distal end 214, and a plurality of holes 216 extending through the rectangular-shaped member. The plurality of holes 216 have an AMPS hole pattern. As shown in FIGS. 2A, 2B, and 2C, two of the holes 216 have countersunk features 217 on the back side 208. The first portion 104 of the T-shaped member 100 has at least two holes 116 extending through the T-shaped member, with the holes having countersunk features 117 on the back side 108 of the first portion. The holes 116 correspond to at least two holes in the plurality of holes 216 having the AMPS hole pattern in the rectangular-shaped member 200. Therefore, the holes 116 extending through the T-shaped member 100 are two-holes of an AMPS hole pattern.

The back side 208 of the rectangular-shaped member 200 is attached to the front side 110 of the T-shaped member 100. Moreover, as can be seen in FIG. 4, the attachment surfaces are the front side 110 of the first portion 104 of the T-shaped member 100 to the back side 208 of the rectangular-shaped member 200. As used, the back side 108 of the T-shaped member 100 is attached to a vehicle control device 500. The front side 210 of the rectangular-shaped member 200 attaches to the AMPS hole pattern plate 404.

Referring to FIGS. 3A, 3B, & 3C, a sleeve 300 is shown. The sleeve 300 shown is present on the yokes of P-3C aircraft. The sleeve 300 has a back side (first side) 308, a front side 310 (second side), a proximal end 312, and distal end 314. A plurality of holes 316 extend through the sleeve 300. Each of the holes 316 have respective countersunk features 317 on the front side 310. The sleeve 300 is substantially C-shaped in profile, which is evident in FIGS. 3A and 3C. The back side 308 is attached to the faceplate 502 of the vehicle control/steering device 500, i.e. yoke, as shown in FIG. 5. The space on the back side 308 of the sleeve 300 is a void space 320, as shown in FIG. 3A. As can be ascertained when viewing FIGS. 3A, 3B, 3C, and 5, the void 320 in the sleeve 300 is a channel when attached to the faceplate 502 by being defined by the faceplate and interior edges of the sleeve circumscribing the void.

For reference, FIG. 5 is viewed from a pilot's perspective in an aircraft, specifically a P-3C aircraft. FIGS. 6 & 7 show the interface mount 402 attached to the vehicle control device 500, i.e. the yoke in the P-3C aircraft. The attachment of the T-shaped member 100 to the vehicle control device 500 is by mating engagement of the T-shaped member's second portion 106 with the void 320 in the sleeve 300. The attachment is performed by inserting the distal end 114 of the T-shaped member's second portion 106 into the void 320, i.e. the mating engagement with the sleeve 300. As such, the second portion 106 of the T-shaped member 100 can be referred to as a "tab" and also a "lost motion connection" when combined with the sleeve 300.

The fit of the second portion 106, upon inserting the distal end 114 into the sleeve 300 (specifically the channel 320) is snug inside the channel but not so tight as to prevent a pilot from removing the apparatus 402. The first portion 104 has a first portion thickness. The second portion 106 has a second portion thickness. The first portion thickness is greater than the second portion thickness due to the second portion 106 being milled out to assure an appropriate fit with the sleeve 300. i.e. the channel 320.

In most instances, the snugness of the second portion 106 inside the sleeve 300 is sufficient to assure that the second portion, i.e. the tab and, when assembled, the interface mount 402 does not slide out of the sleeve. However, as an additional safety measure to guard against the second portion 106 of the T-shaped member 100 slipping out of the sleeve 300, i.e. the channel 320, and to obtain and/or maintain flight clearance approvals, the interface mount 402 includes a securing device 406, sometimes referred to as a retaining device or retaining apparatus. The retaining device 406 prevents the second portion 106 from moving upward and out of the sleeve 300. As shown in FIG. 4, the securing device 406 connects the distal end 114 of the T-shaped member 100 to the distal end 214 of the rectangular-shaped member 200.

The retaining device 406 works with a combination of pass holes or apertures. Referring to FIGS. 1A, 1B, 1C, 2A, 2B, and 2C include a first pass-through hole 118 (FIGS. 1A, 1B, & 1C) in the distal end 114 of the T-shaped member 100. A second pass-through hole 218 (FIGS. 2A, 2B, & 2C) is in the distal end 214 of the rectangular-shaped member/plate 200. The retaining device 406 is a clip, sometimes referred to as a retaining clip, retaining ring, or checklist style ring. The retaining clip 406 is shown in its closed position and is configured to removably-attach the distal ends 114 & 214 of the T-shaped member 100 and rectangular-shaped member 200, respectively. Alternatively, nuts and bolts could also be used in place of the retaining clip 406, along with appropriately-sized washer(s). However, that alternative is not capable of being installed or removed as quickly as the retaining clip 406 shown in FIG. 4.

Referring simultaneously to FIGS. 5, 6, and 7, another embodiment relates to an interface system 700. The system is shown in FIG. 7 and includes a vehicle control device (a yoke) 500 and an AMPS hole pattern plate 404. The vehicle control device 500 has a proximal end 512 and a distal end 514. The distal end 514 has a faceplate 502 facing a vehicle operator (the user, such as a pilot). The faceplate 502 has the sleeve 300 discussed earlier. The interface mount 402 is shown assembled and attached to the yoke 500. The second portion 106 of the T-shaped member 100 (shown in detail in FIGS. 1A, 1B, and 1C) and, specifically, the distal end 114 is mated with the sleeve 300.

Figure 10:
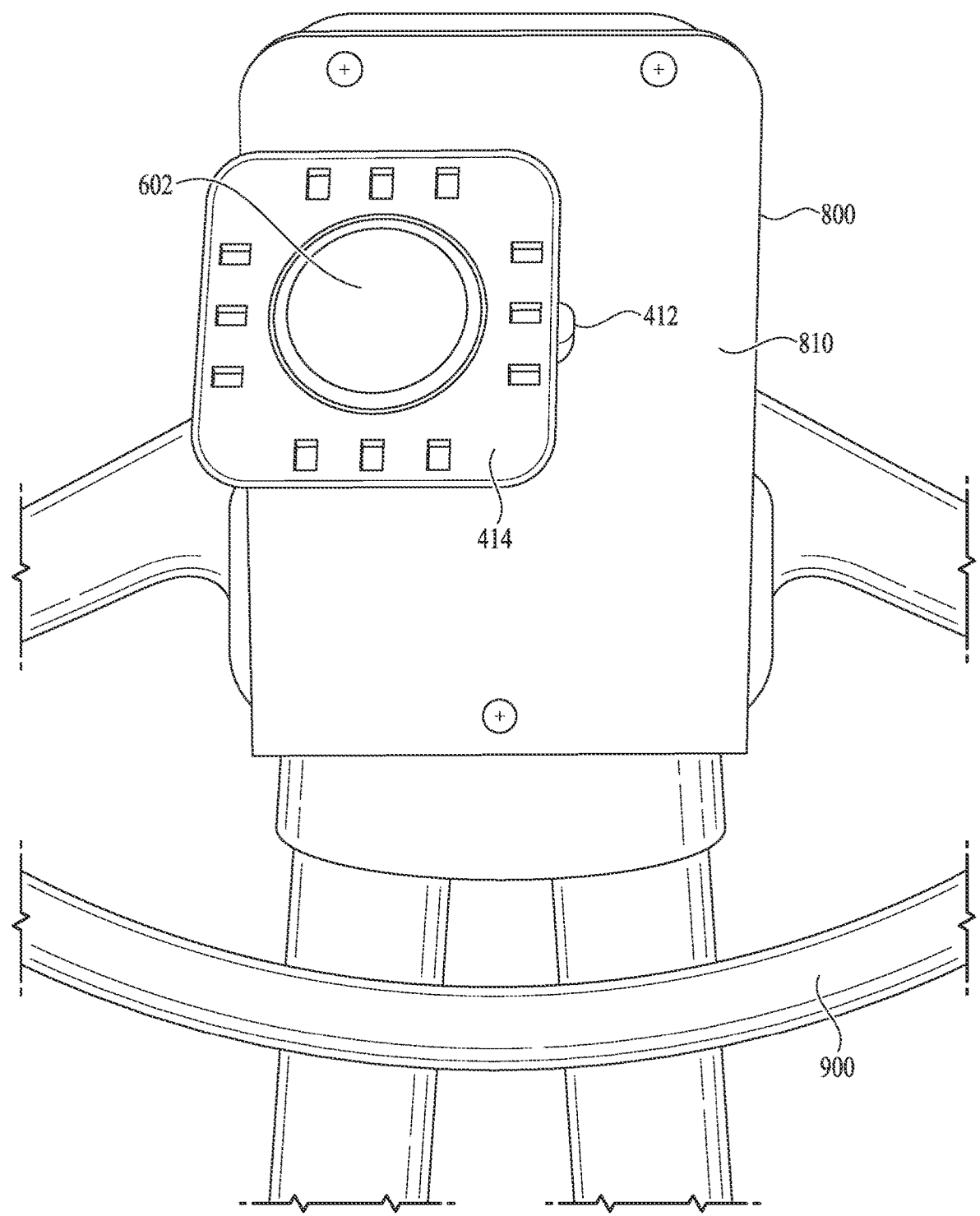
FIG. 10 is a front perspective view of the interface plate from FIGS. 8A and 8B attached to the aircraft yoke in FIG. 9 and an AMPS hole pattern plate assembly.

The AMPS hole pattern plate 404 has two sides. One side of the AMPS hole pattern plate 404 is attached to the front side 210 of the rectangular-shaped member 200. The other side of the AMPS hole pattern plate 404 has a dog bone section 410. The dog bone section 410 is attached at its distal end to a locking nut 412. The locking nut 412 is attached at its distal end to a mounting plate 414. The mounting plate 414 is configured to attach to a mobile computer protective case 702. As shown in FIGS. 6, 10, and 13, mounting plate 414 has a center portion 602 that is decorative and used for aesthetics and labeling purposes.

The mobile computer protective case 702 is shown housing a mobile computer 704. The dog bone section 410 and the locking nut 412 allow the operator to turn the case 702 to a desired sight line for viewing the mobile computer 704. The embodiments act on and attach with the AMPS hole pattern plate 404 and, as such, work with the dog bone section 410, locking nut 412, mounting plate 414, protective case 702, and mobile computer 704.

Figure 8B:
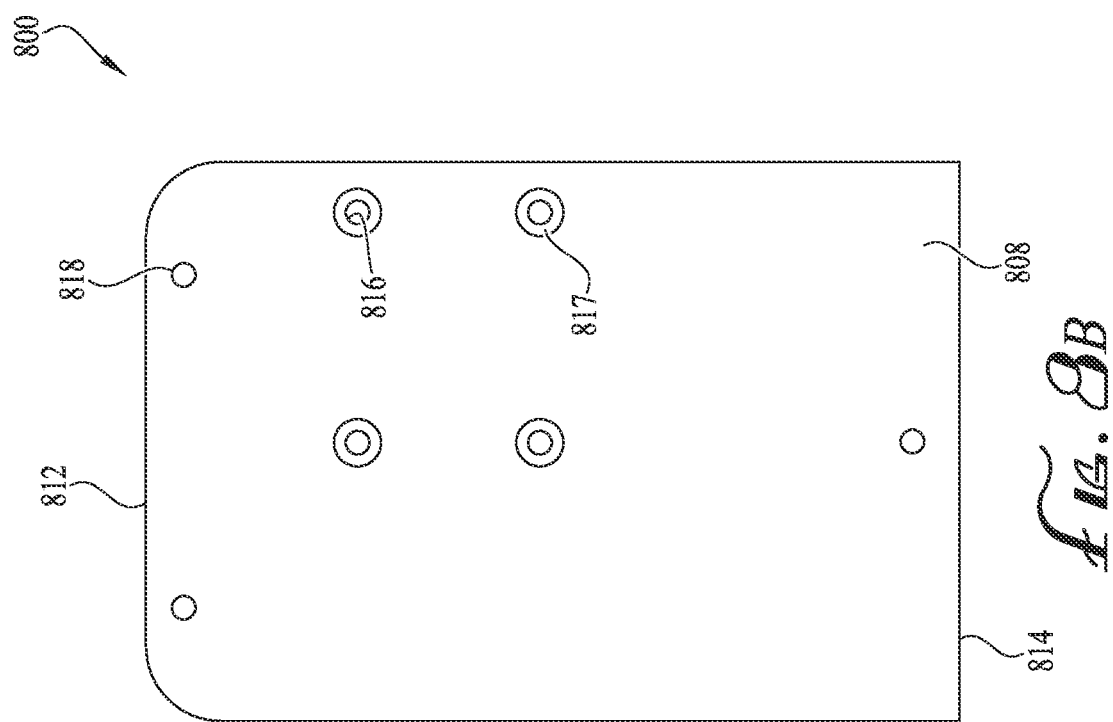
FIGS. 8A and 8B are front and back views, respectively, of an interface plate for use between an aircraft yoke and an AMPS hole pattern plate, according to some embodiments.
Figure 8A:
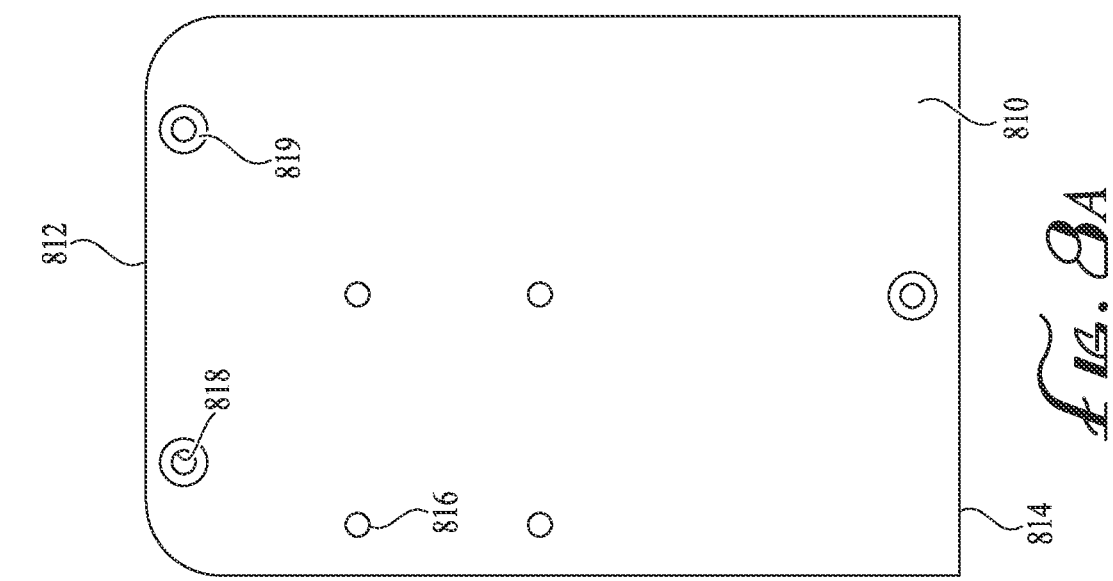
Figure 9:
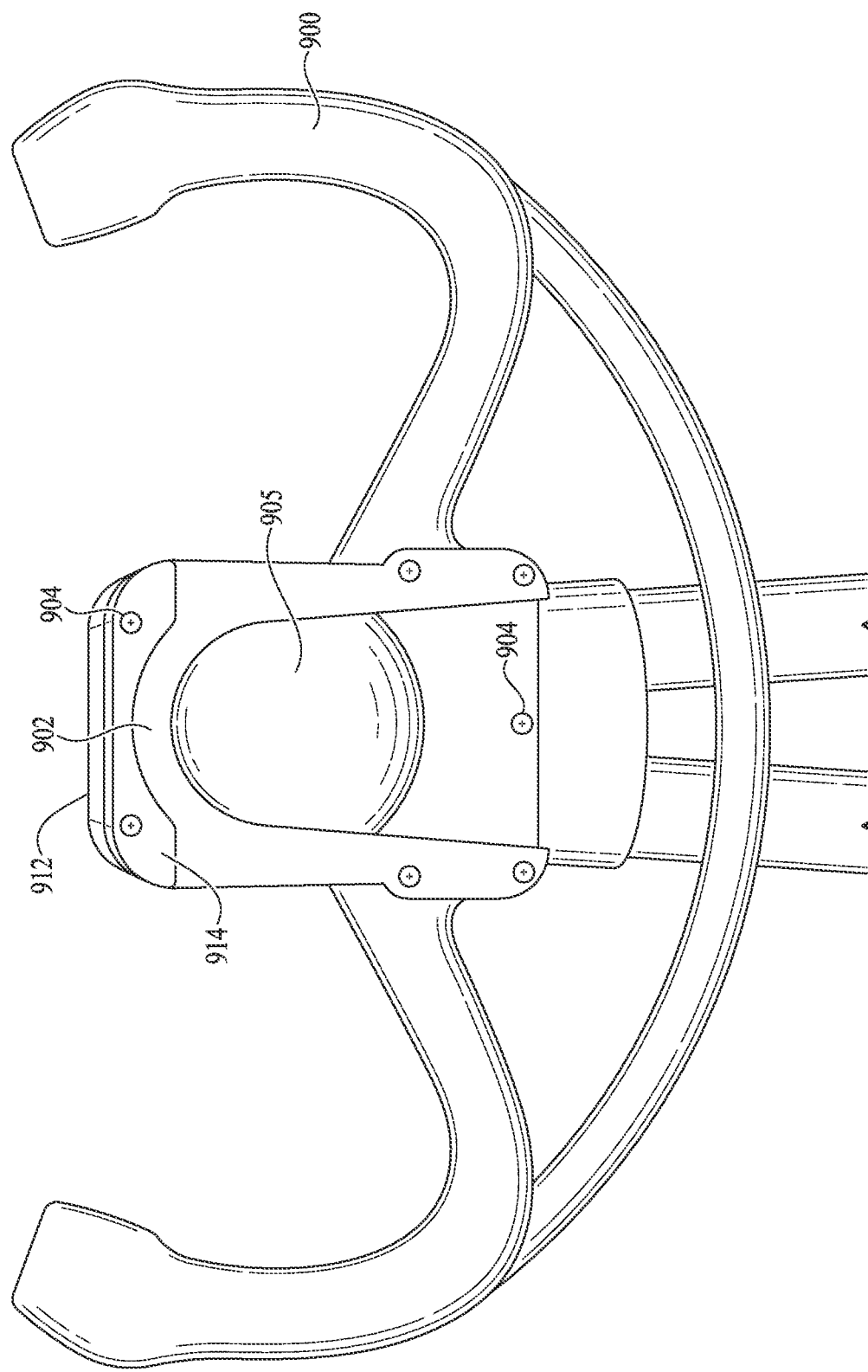
FIG. 9 is a front perspective view of an aircraft yoke including a faceplate that the interface plate in FIGS. 8A and 8B acts upon.
Figure 11B:
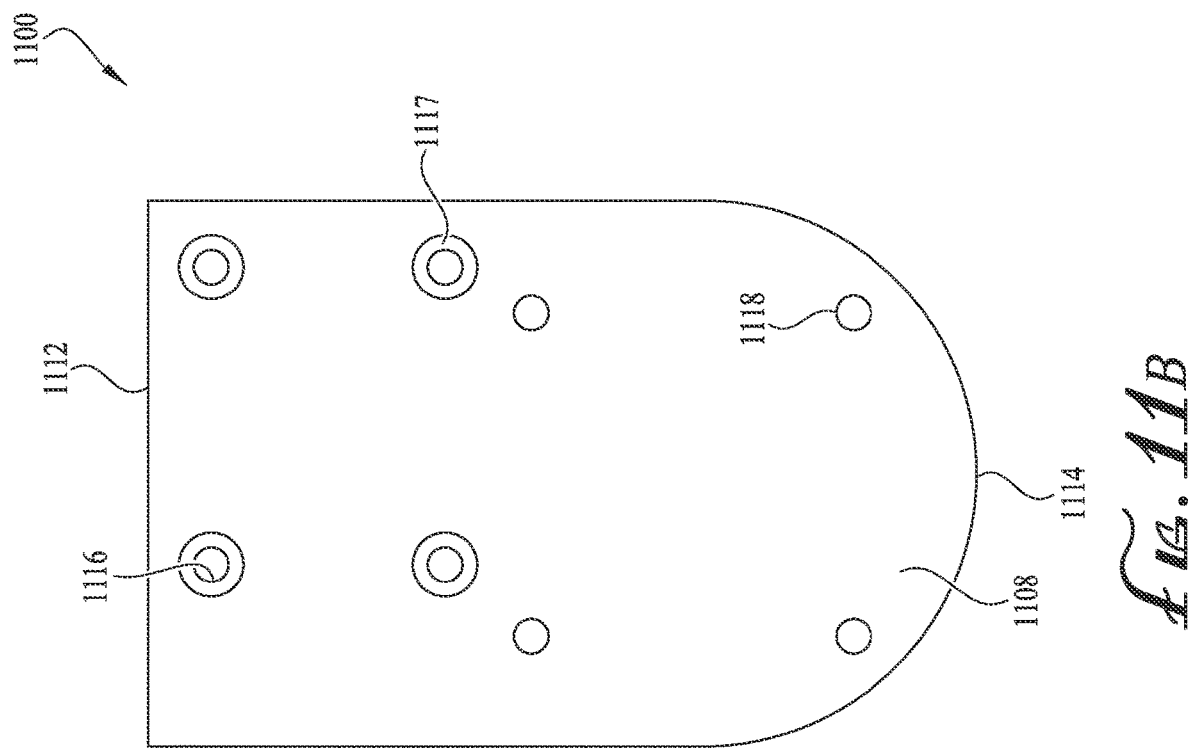
FIGS. 11A and 11B are front and back view, respectively, of an alternative interface plate for use between an aircraft yoke and an AMPS hole pattern plate, according to some embodiments.
Figure 11A:
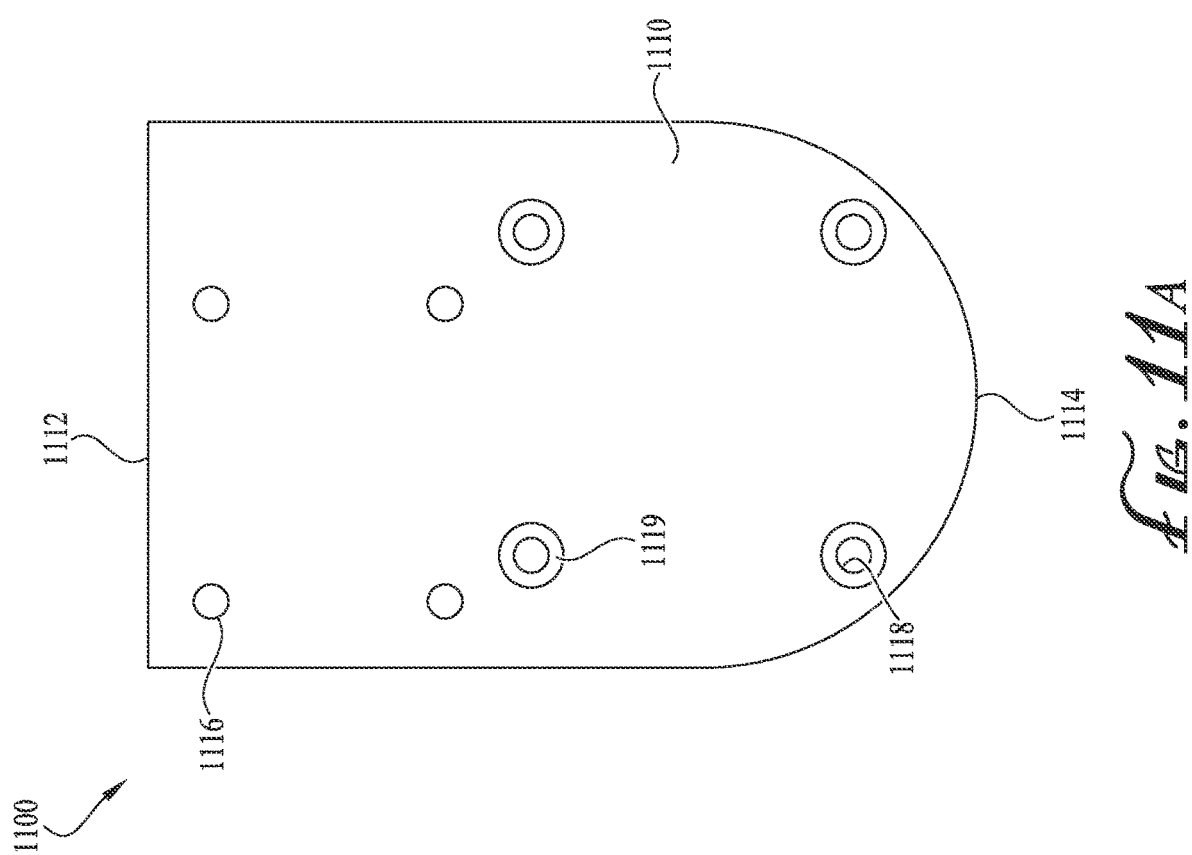
Figure 12:
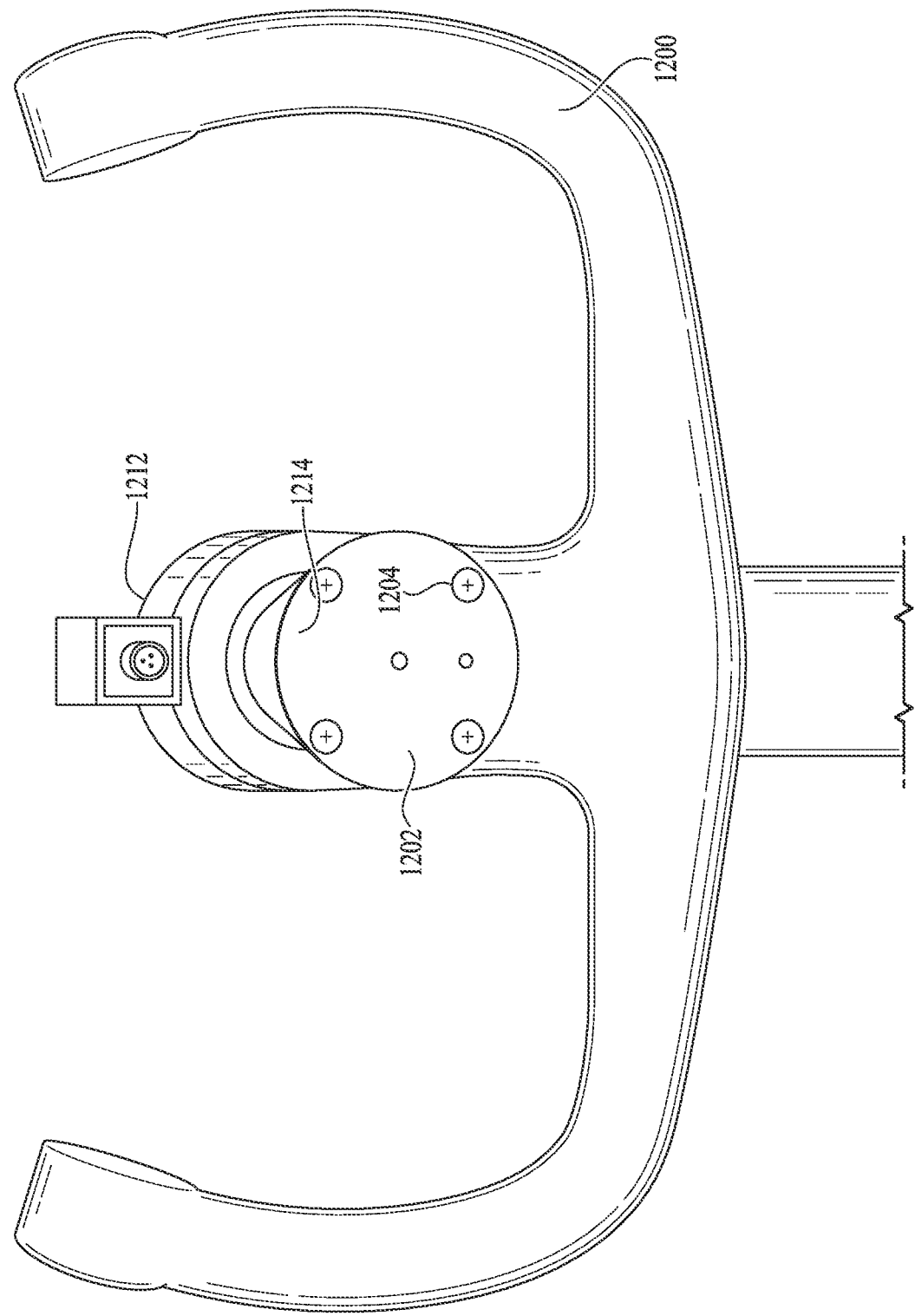
FIG. 12 is a close-up front perspective view of an aircraft yoke that the interface plate in FIGS. 11A and 11B acts upon.

FIGS. 8A, 8B, and 10 shows an interface plate 800 that is configured to attach to and act upon an aircraft yoke 900 (FIGS. 9 and 10). FIGS. 8A and 8B are front and back views, respectively, of the interface plate 800. The yoke 900 in FIG. 9 is for a P-3A aircraft. FIGS. 11A and 11B illustrate front and back views, respectively, of an interference plate 1100 for a C-130 aircraft. FIGS. 12 and 13 depict a yoke 1200 for the C-130 aircraft, creating a work piece environment that the interface plate 1100 acts upon.

Referring simultaneously FIGS. 8A, 8B, 9, and 10, an interface system includes an aircraft yoke 900. The yoke has a proximal end 912 and a distal end 914. The distal end 914 has a face plate 902 facing a user, sometimes referred to as a vehicle operator, i.e. the pilot. The faceplate 902 has a plurality of holes 904 in a triangular pattern, two holes at the top and one at the bottom of the face plate.

The interface plate 800 is an anodized aluminum plate having a back side 808 (first side), a front side 810 (second side), a proximal end 812, and a distal end 814. The interface plate 800 is substantially-rectangular in shape. Corners may be rounded to prevent snagging and lacerations. A plurality of holes having an AMPS hole pattern 816 are shown in both FIGS. 8A and 8B of the anodized aluminum plate 800. The holes 816 have countersunk features 817 on the back side 808 of the anodized aluminum plate 800. The plurality of holes 904 in the triangular pattern on the face plate 902 has matching holes 818 in the anodized aluminum plate 800. The matching holes 818 have countersunk features 819 on the front side 810 of the anodized aluminum plate 800.

The back side 808 of the anodized aluminum plate 800 is configured to attach to the faceplate 902. The front side 910 of the anodized aluminum plate 800 is configured to act on an AMPS hole pattern plate 404. The AMPS hole pattern plate 404 has two sides. One side of the AMPS hole pattern plate 404 is attached to the front side 810 of the anodized aluminum plate 800. The other side of the AMPS hole pattern plate 404 has a dog bone section 410. The dog bone section 410 is attached at its distal end to a locking nut 412. The locking nut 412 is attached at its distal end to a mounting plate 414. The mounting plate 414 is configured to attach to a mobile computer protective case 702. As shown in FIG. 7, the mobile computer protective case 702 is shown housing a mobile computer 704.

Referring to FIG. 9, it is evident that the P-3A aircraft yoke 900 has a center portion of the faceplate 902 resembling a hub or bubble 905. The interior of the yoke 900 underneath the hub 905 is conglomeration of wires (not shown for ease of viewing) used for various aircraft control purposes. As such, the hub 905 can be considered a protective shroud for the wires and is configured to give the wires more room during aircraft turns.

Referring to FIGS. 8, 9, and 10, the interface plate 800 for the P-3A is configured such that its holes 816 are offset (i.e. not centered) on the interface plate. It follows that the AMPS hole pattern plate 404 is also offset when attached to the interface plate 800 through holes 816. The reason is to avoid possible interference with aircraft yoke controls and not block the pilot's view of certain instrument cluster gauges on the front panel of the cockpit when using the example attachment system (illustrated by the dogbone section 410, locking nut 412, and mounting plate 414). A person having ordinary skill in the art will recognize that the holes 816 can be oriented differently (i.e. not offset) when using a different attachment system without detracting from the merits or generalities of the embodiments. The orientation of the view in FIG. 10 is such that the AMPS hole pattern plate 404 is hidden by the mounting plate 414. A portion of the locking nut 412 is visible.

FIGS. 11A and 11B show front and back views, respectively, of an interference plate 1100 for a C-130 aircraft. FIGS. 12 and 13 depict a yoke 1200 for the C-130 aircraft, creating a work piece environment that the interface plate 1100 acts upon. Referring simultaneously FIGS. 11A, 11B, 12, and 13, an interface system includes the yoke 1200. The yoke 1200 has a proximal end 1212 and a distal end 1214. The distal end 1214 has a face plate 1202 facing a user (the pilot). The faceplate 1202 has a plurality of holes 1204.

The interface plate 1100 is an anodized aluminum plate having a back side 1108 (first side), a front side 1110 (second side), a proximal end 1112, and a distal end 1114. The plate 1100 is substantially-square on its proximal end 1112 and rounded on its distal end 1114. A plurality of holes having an AMPS hole pattern 1116 are shown in both FIGS. 11A and 11B of the anodized aluminum plate 1100 and extend through the anodized aluminum plate. The holes 1116 are offset in similar fashion as described above with respect to the interface plate 800 in FIG. 8. The holes 1116 have countersunk features 1117 on the backside 1108 of the anodized aluminum plate 1100. The plurality of holes 1204 on the faceplate 1202 has matching holes 1118 in the anodized aluminum plate 1100. For nomenclature, the matching holes 1118 are also referred to as a first set of holes. The first set of holes 1118 extend through the anodized aluminum plate 1100 and have countersunk features 1119 on the front side 1110 of the anodized aluminum plate 1100. Likewise, for nomenclature, the plurality of holes having an AMPS hole pattern 1116 are also referred to as a second set of holes having an AMPS hole pattern or simply a second set of holes.

The assembled embodiment in FIG. 13 does not include the faceplate 1202 from FIG. 12. The faceplate 1202 (shown in FIG. 12) is removed and the back side 1108 of the anodized aluminum plate 1100 is configured to attach to the yoke 1200 using the holes (which are threaded) 1204 that were previously used by the faceplate 1202. Thus, the faceplate 1202 was removed and replaced with the anodized aluminum plate 1100. The first set of holes 1118 have a corresponding orientation with the holes 1204 in the distal end 1214 of the yoke 1200.

The front side 1110 of the anodized aluminum plate 1100 is configured to act on an AMPS hole pattern plate 404. The AMPS hole pattern plate 404 has two sides. One side of the AMPS hole pattern plate 404 is attached to the front side 1110 of the anodized aluminum plate 1100.

While the embodiments have been described, disclosed, illustrated and shown in various terms of certain embodiments or modifications which it has presumed in practice, the scope of the embodiments is not intended to be, nor should it be deemed to be, limited thereby and such other modifications or embodiments as may be suggested by the teachings herein are particularly reserved especially as they fall within the breadth and scope of the claims here appended.

What is claimed is:

1. An interface system between an aircraft yoke and an AMPS hole pattern plate attached to
   a mobile computer protective case, said interface system, comprising:
   an aircraft yoke having a proximal end and a distal end, said distal end facing a pilot, said distal end configured with a plurality of holes;
   an anodized aluminum plate having a first side, a second side, a proximal end, a distal end, and matching holes extending through said anodized aluminum plate, wherein said matching holes having a corresponding orientation with said plurality of holes in said distal end of said aircraft yoke;
   wherein said first side of said anodized aluminum plate is configured to attach to said distal end of said aircraft yoke;
   wherein said anodized aluminum plate having a plurality of holes in an AMPS hole pattern extending through said anodized aluminum plate;
   wherein said plurality of holes in an AMPS hole pattern are located vertically between a matching hole proximate to said proximal end of said anodized aluminum plate and a matching hole proximate to said distal end of said anodized aluminum plate; and
   an AMPS hole pattern plate having proximal and distal ends, said proximal end attached to said second side of said anodized aluminum plate, said distal end configured for attachment to a mobile computer protective case.

2. The system according to claim 1, wherein said anodized aluminum plate is substantially-rectangular in shape.

3. The system according to claim 1, wherein said matching holes having at least one hole proximate to said proximal end of said anodized aluminum plate and at least one hole proximate to said distal end of said anodized aluminum plate.

* * * * *